(12) United States Patent
Sirin et al.

(10) Patent No.: US 11,372,183 B2
(45) Date of Patent: Jun. 28, 2022

(54) FIRE RESISTANT, ALL DIELECTRIC FIBER OPTIC CABLE

(71) Applicant: Prysmian S.p.A., Milan (IT)

(72) Inventors: Zekeriya Sirin, Milan (IT); Baris Soenmez, Milan (IT); Can Altingoez, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 15/734,876

(22) PCT Filed: Jun. 6, 2018

(86) PCT No.: PCT/EP2018/064832
§ 371 (c)(1),
(2) Date: Dec. 3, 2020

(87) PCT Pub. No.: WO2019/233572
PCT Pub. Date: Dec. 12, 2019

(65) Prior Publication Data
US 2021/0239929 A1 Aug. 5, 2021

(51) Int. Cl.
G02B 6/44 (2006.01)

(52) U.S. Cl.
CPC ......... G02B 6/4436 (2013.01); G02B 6/4432 (2013.01); G02B 6/4494 (2013.01)

(58) Field of Classification Search
CPC ............................ G02B 6/4436; G02B 6/4494
See application file for complete search history.

(56) References Cited

U.S. PATENT DOCUMENTS

| 5,444,809 A | * | 8/1995 | Aoki | C09K 21/12 |
| | | | | 525/169 |
| 6,640,033 B2 | | 10/2003 | Auvray et al. | |
| 6,681,070 B2 | * | 1/2004 | Cecchi | G02B 6/441 |
| | | | | 385/109 |
| 2003/0103742 A1 | * | 6/2003 | Auvray | G02B 6/4436 |
| | | | | 385/109 |

FOREIGN PATENT DOCUMENTS

| CA | 2367814 A1 * 10/2000 | ........... G02B 6/4494 |
| CN | 107430255 A * 12/2017 | ............. G02B 6/441 |

(Continued)

OTHER PUBLICATIONS

ASTM International D566-02, Designation: 132/96, "Standard Test Method for Dropping Point of Lubricating Grease," 2002, 5 pages.

(Continued)

*Primary Examiner* — Charlie Y Peng
(74) *Attorney, Agent, or Firm* — Slater Matsil, LLP

(57) ABSTRACT

Disclosed is a fire resistant, all dielectric fiber optic cable with high fiber count. The cable comprises a core including a central strength member and buffer tubes containing fibers, arranged around the central strength member. A first mica layer is arranged around the core. A glass yarn layer surrounds the first mica layer and is in direct contact therewith. A inner sheath surrounds the glass yarn layer. A second mica layer surrounds the inner sheath. An outer sheath surrounds the second mica layer. The buffer tubes contain a water-blocking filling material comprising a silicone gel, wherein said silicone gel has a drop point of at least 200° C.

20 Claims, 1 Drawing Sheet

(56) References Cited

FOREIGN PATENT DOCUMENTS

| | | | |
|---|---|---|---|
| EP | 3270201 A1 | | 1/2018 |
| JP | S61253719 A | | 11/1986 |
| KR | 20140013563 A | * | 2/2014 |
| RU | 162467 U1 | * | 6/2016 |
| WO | 2007049090 A1 | | 5/2007 |

OTHER PUBLICATIONS

Draka, "Non-metallic armoured, fire resistant cable, double LSZH sheathed, up to 144 fibres," Firetuf OFC-LT-NM, Version 1.3, Dec. 5, 2017, 3 pages.
International Electrotechnical Commission, Norme International Standard, CEI IEC 60331-25, "Tests for electric cables under fire conditions, Circuit integrity, Part 25: Procedures and requirements, Optical fibre cables," Premiere edition, First edition, 1999-04, 7 pages.
International Electrotechnical Commission, Norme International Standard, CEI IEC 60332-3-24, "Tests on electric cables under fire conditions, Part 3-24: Test for vertical flame spread of vertically-mounted bunched vires or cables, Category C," Oct. 2000, 28 pages.
International Electrotechnical Commission, Norme International Standard, CEI IEC 61034-2, "Measurement of smoke density of cables burning under defined conditions, Part 2: Test procedure and requirements," Apr. 2005, 40 pages.

* cited by examiner

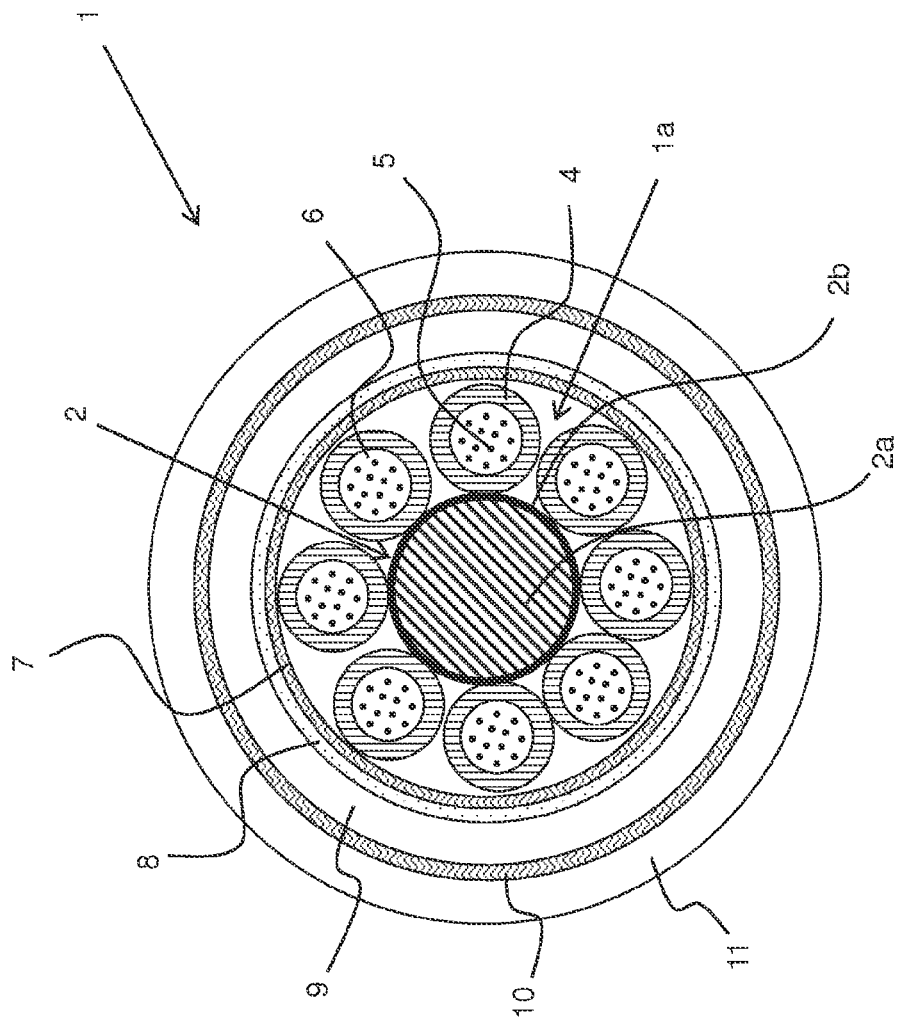

FIRE RESISTANT, ALL DIELECTRIC FIBER OPTIC CABLE

CROSS-REFERENCE TO RELATED APPLICATIONS

This application is a national stage of International Application No. PCT/EP2018/064832, filed on Jun. 6, 2018, which application is hereby incorporated herein by reference in its entirety.

TECHNICAL FIELD

The present disclosure relates to the field of optical cables suitable for operating during a fire and thereafter. In particular, the present disclosure relates to a fire resistant, all dielectric fiber optic cable having a high fiber count.

BACKGROUND

In certain applications, optical cables should be able to withstand fire without significantly decreasing of their transmission performance. For instance, cables used in fire alarm systems and/or local video surveillance should be able to continue to transmit data/signals in the presence of fire.

The use of metal armors inserted between the outermost layers of the cable can make a certain contribution in this sense. However, some applications require that the cable does not include any metal part (the so-called "all dielectric cable"). In these cables, the absence of metal armors reduces the protection of optical fibers to a certain extent in the event of a fire.

The brochure Firetuf® OFC-LT-NM (2017) shows non-metallic armored, fire resistant cable, double LSZH (low smoke zero halogen) sheathed, containing up to 144 fibers. This cable in particular can comprise a cable core including a central strength member covered with LSZH, and loose tubes (each containing 12 fibers) around the strength member. A water barrier made of a water swellable tape and a layer of glass yarns surround the cable core, the latter acting as both a reinforcing layer and an additional fire protection. The cable sheath comprises an inner sheath, an outer sheath and a fire blocking tape interposed between them. Both the inner sheath and the outer sheath are made of LSZH material.

U.S. Pat. No. 6,640,033 discloses a fiber optic cable having fire and smoke retardant properties, wherein these properties are provided by two layers of mica tape wrapped around the centre cable core. Between the two layers of mica tape there is a layer of flame-retardant yarns, which form air gaps between the two layers of the mica tape. The cable core comprises a central strength member and a plurality of buffer tubes, each comprising a plurality offibers. The central strength member and the buffer tubes are made of flame and smoke-retardant materials, e.g. glass-reinforced plastic material for the central strength member and thermoplastic materials for the buffer tubes. The jacket of the cable is made of a flame and smoke retardant material.

SUMMARY

The Applicant has faced the problem of providing an all dielectric fiber optic cable with high fiber count, which is capable of maintaining its performance not only during fire but also for a predetermined period of time after the fire is extinguished.

Optical fibers have a coefficient of thermal expansion lower than that of the polymeric buffer tubes housing them. During the cooling after fire, the buffer tube shrinkage can mechanically stress the optical fibers up to breakage. As a result, the cable functionality, which was maintained during fire, may be impaired and the signal attenuated or even interrupted.

The Applicant experienced that damages to the optical fiber after fire was reduced by providing a silicone gel as water-blocking material inside the buffer tubes, said silicone gel having a drop point higher than 200° C. Silicone is generally a very stable polymer, a great deal of this stability deriving from reversible hydrolysis reactions occurring under heating such that the polymer essentially heals itself. Applicant observed that a silicone gel surrounding the optical fibers during and after fire could provide some protection against mechanical stress.

Therefore, according to a first aspect, the present disclosure provides a fire resistant, all dielectric fiber optic cable comprising: a fire resistant, all dielectric fiber optic cable comprising: a core comprising: —a central strength member, and a plurality of buffer tubes arranged around the central strength member, each buffer tube containing a plurality of opticalfibers; a first mica layer arranged around the core; a glass yarn layer surrounding and in direct contact with the first mica layer; an inner sheath surrounding the glass yarn layer; a second mica layer surrounding the inner sheath; and an outer sheath surrounding the second mica layer, wherein the buffer tubes contain a water-blocking filling material comprising a silicone gel, wherein said silicone gel has a drop point of at least 200° C.

In an embodiment, the fiber optic cable of the present disclosure comprises at least twenty-four (24) optical fibers. The fiber optic cable can contain up to 144 optical fibers.

The number of buffer tubes in a cable and the number of optical fibers contained in each buffer tube may vary according to cable specification or customer request. For example, each buffer tube may contain from 5 to 12 optical fibers.

In an embodiment, the central strength member comprises a body of reinforced dielectric material.

In an embodiment, the central strength member comprises a hydroxide-containing flame retardant polymeric material. This embodiment is particularly suitable when the fiber optic cable comprises 72 optical fibers or more.

In an embodiment, the hydroxide-containing flame retardant polymeric material is embedded in the reinforced dielectric material of the central strength member. In another embodiment, the hydroxide-containing flame retardant polymeric material of the central strength member is in the form of a layer applied over the body of the central strength member.

In an embodiment, the hydroxide-containing flame retardant polymeric material of the central strength member has a limiting oxygen index (LOI) s 35%.

In an embodiment, the hydroxide-containing flame retardant polymeric material of the central strength member is a low smoke zero halogen material (LSoH or LSZH), a.k.a. halogen-free flame retardant material (HFFR). Flame retardant LSoH materials do not release toxic fumes.

In the present description and claims, as "hydroxide-containing flame retardant polymeric material" it is meant a polymeric material containing an inorganic flame-retardant filler selected from: metal hydroxides, hydrated metal oxides, metal salts having at least one hydroxyl group, and hydrated metal salts, said filler being capable of releasing water when heated.

In an embodiment, the hydroxide-containing flame retardant polymeric material of the central strength member comprises a flame-retardant filler selected from aluminum or magnesium hydroxide, aluminum or magnesium hydrated oxide, aluminum or magnesium salt having at least one hydroxyl group or aluminum or magnesium hydrated salt.

In an embodiment, the hydroxide-containing flame retardant polymeric material of the central strength member comprises magnesium hydroxide, alumina trihydrate or hydrated magnesium carbonate. In another embodiment, the hydroxide-containing flame retardant polymeric material of the central strength member comprises magnesium hydroxide.

Magnesium hydroxide is characterized by a decomposition temperature of about 340° C. and thus allows high extrusion temperatures to be used. The magnesium hydroxide of the present disclosure can be of synthetic or natural origin, the latter being obtained by grinding minerals based on magnesium hydroxide, such as brucite or the like, as described, for example, in WO2007/049090.

The flame-retardant filler can be used in the form of particles which are untreated or surface-treated with saturated or unsaturated fatty acids containing from 8 to 24 carbon atoms, or metal salts thereof, such as, for example: oleic acid, palmitic acid, stearic acid, isostearic acid, lauric acid; magnesium or zinc stearate or oleate; and the like. In order to increase the compatibility with the polymer material, the flame-retardant filler can likewise be surface-treated with suitable coupling agents, for example short chain organic silanes or titanates such as vinyltriethoxysilane, vinyltriacetylsilane, tetraisopropyl titanate, tetra-n-butyl titanate and the like.

In an embodiment, the hydroxide-containing LSoH flame retardant polymeric material of the central strength member comprises a polymer selected from: polyethylene; copolymers of ethylene with at least one α-olefin containing from 3 to 12 carbon atoms, and optionally with at least one diene containing from 4 to 20 carbon atoms; polypropylene; thermoplastic copolymers of propylene with ethylene and/or at least one α-olefin containing from 4 to 12 carbon atoms; copolymers of ethylene with at least one ester selected from alkyl acrylates, alkyl methacrylates and vinyl carboxylates, wherein the alkyl and the carboxylic groups comprised therein are linear or branched, and wherein the linear or branched alkyl group may contain from 1 to 8, for example from 1 to 4, carbon atoms, while the linear or branched carboxylic group may contain from 2 to 8, for example from 2 to 5, carbon atoms; and mixtures thereof.

With "α-olefin" it is generally meant an olefin of formula CH2=CH—R, wherein R is a linear or branched alkyl having from 1 to 10 carbon atoms. The α-olefin can be selected, for example, from propylene, 1-butene, 1-pentene, 4-methyl-1-pentene, 1-hexene, 1-octene, 1-dodecene and the like. In an embodiment, the α-olefin is selected from propylene, 1-butene, 1-hexene and 1-octene.

Examples of polymer that may be used in the flame retardant LSoH polymeric material for the central strength member of the present disclosure are: high-density polyethylene (HDPE) (d=0.940-0.970 g/cm$^3$), medium-density polyethylene (MDPE) (d=0.926-0.940 g/cm$^3$), low-density polyethylene (LDPE) (d=0.910-0.926 g/cm$^3$); linear low-density polyethylene (LLDPE) and very-low-density polyethylene (VLDPE) (d=0.860-0.910 g/cm$^3$); polypropylene (PP); thermoplastic copolymers of propylene with ethylene; ethylene/vinyl acetate (EVA) copolymers; ethylene/ethyl acrylate (EEA) copolymers, ethylene/butyl acrylate (EBA) copolymers; ethylene/α-olefin rubbers, in particular ethylene/propylene rubbers (EPR), ethylene/propylene/diene rubbers (EPDM); and mixtures thereof.

In an embodiment, the silicone gel as water-blocking material is a poly-organosiloxane, for example dimethylsiloxane, dimethyl-methylphenyl siloxane, methyl-phenylsiloxane.

In an embodiment, the silicone gel as water-blocking material has a drop point ≥250° C.

In an embodiment, the first mica layer comprises one or two mica tapes. The mica tape/s is/are wound around the core comprising the central strength member and the buffer tubes. When two mica tapes are present, they can be wound in the same direction.

In an embodiment, water swellable material in form of one or more water swellable tapes or water swellable yarns may be present in the cable. Water swellable material may be interposed between cable core and first mica layer and/or between the glass yarn layer and the inner sheath and/or between the inner sheath and the second mica layer. In an embodiment, water swellable yarns can be applied around the central strength member.

In an embodiment, the inner sheath and/or the outer sheath are made of a flame retardant LSoH polymeric material. In an embodiment, this material has a limiting oxygen index (LOI)≥30%, for example ≥40%. In an embodiment, the flame retardant LSoH polymer-based material of the inner sheath and/or of the outer sheath can have a LOI≤70%, for example ≤600%.

In an embodiment, the inner sheath and the outer sheath are made of the same LSoH flame-retardant polymeric material.

In another embodiment, the LSoH flame-retardant polymeric material of the inner sheath has a LOI higher than that of the outer sheath material.

The polymer material of the inner and the outer sheath can be selected from the list already given in connection with the hydroxide-containing flame retardant material of the central strength member. The same applies for the inorganic-flame retardant filler contained therein.

In further embodiment, the buffer tubes are made of a polymer base mixed with inorganic-flame retardant filler/s, too.

In an embodiment, the amount of the flame-retardant filler in any flame retardant LSoH polymeric material for the cable of the present disclosure is lower than 500 phr, for example from 130 phr to 300 phr.

Within the present description and the claims, the term "phr" (acronym of "parts per hundred of rubbers") is used to indicate parts by weight per 100 parts by weight of the polymer base material.

For the purpose of the present description and of the appended claims, except where otherwise indicated, all numbers expressing amounts, quantities, percentages and so forth, are to be understood as being modified in all instances by the term "about". Also, all ranges include any combination of the maximum and minimum points disclosed and include any intermediate ranges therein, which may or may not be specifically enumerated herein.

The present disclosure, in at least one of the aforementioned aspects, can be implemented according to one or more of the following embodiments, optionally combined together.

For the purpose of the present description and claims, an optical fiber comprises a core surrounded by a cladding, said core and cladding being generally made of glass, and one or two protecting coatings based, for example, on acrylate material.

For the purpose of the present description and claims, as "limiting oxygen index" (LOI) it is meant the minimum concentration of oxygen, expressed as a percentage, that will support combustion of a polymer. Higher values of LOI indicate greater fire retardancy. LOI values are determined by standards, such as ASTM D2863-12 (2012).

The minimum concentration of oxygen, expressed as a percentage that will support combustion of a polymer. Higher values of LOI indicate greater fire retardancy. LOI values are determined by standards, such as ASTM D2863-12 (2012). The minimum concentration of oxygen, expressed as a percentage, that will support combustion of a polymer. Higher values of LOI indicate greater fire retardancy. LOI values are determined by standards, such as ASTM D2863-12 (2012).

For the purpose of the present description and appended claims, drop point is a numerical value assigned to a grease composition representing the temperature at which the first drop of material falls from a test cup. Drop point can be measured under the conditions set forth in ASTM D566-02 (2002).

For the purpose of the present description and appended claims, as "high fiber count" is meant a fiber optic cable containing at least 24 optical fibers.

BRIEF DESCRIPTION OF THE DRAWINGS

The present disclosure will become fully clear after reading the following detailed description, given by way of example and not of limitation, with reference to the attached FIG. 1 which is a cross-section of a fire resistant, all dielectric fiber optic cable according an embodiment of the present disclosure.

DETAILED DESCRIPTION OF ILLUSTRATIVE EMBODIMENTS

In FIG. 1, the all dielectric fiber optic cable is indicated by reference number 1.

Cable 1 comprises a core 1a. The core 1a, in turn, comprises a central strength member 2 and a plurality of buffer tubes 4, each comprising a plurality of optical fibers 5.

The central strength member 2 is an elongated element and it can have a circular or substantially circular cross-section. In the present embodiment, the central strength member comprises a body 2a of reinforced dielectric material, for example glass reinforced plastic (GRP), fiber reinforced plastic (FRP) or any other similar material.

The body 2a is covered by a coating 2b made of hydroxide-containing flame retardant LSoH polymeric material. The material of the coating 2b contains magnesium hydroxide in an amount of about 130 phr. This material can have a LOI of 28%.

A number of buffer tubes 4 are arranged radially outer with respect to the central strength member 2. In an embodiment, the buffer tubes 4 are stranded around the central strength member 2 in S-Z configuration.

In the embodiment of FIG. 1, eight buffer tubes 4 are provided around the central strength member 2. However, there could be more or less tubes in other embodiments.

The buffer tubes 4 can be made of any suitable polymeric material, for example polybutylene terephthalate (PBT). In an embodiment, the buffer tubes can be made of a hydroxide-containing flame retardant LSoH polymeric material.

Each buffer tube 4 contains a plurality of optical fibers. In an embodiment, each buffer tube 4 contains 12 optical fibers.

Each buffer tube 4 may contain water-blocking filling material 6 comprising a silicone gel with a drop point of at least 200° C.

For example, materials suitable as water-blocking filling for the all dielectric cable of the present disclosure are polyorganosiloxane marketed as Rhodorsil® by Rhodia Siliconi Italia S.p.A., Italy.

It should be remarked that each single buffer tube 4 is not individually protected by fire resistant materials, for example mica tapes.

The core 1a comprising buffer tubes 4 and the central strength member 2 is wrapped by a first mica layer 7.

In an embodiment, the first mica layer 7 comprises two mica tapes. Mica, for example in form of flakes, may be bonded to a backing layer using a binding agent, such as silicone resin or elastomer, acrylic resin and/or epoxy resin. The backing layer may be formed of a supporting fabric, such as woven glass and/or glass cloth.

In an embodiment, each mica tape is wound with an overlapping. The overlapping can be higher than 40%, for example of 50%.

In radial external position and in direct contact with the first mica layer 7 a layer of glass yarns 8 is provided.

The layer of glass yarns 8 and the first mica layer 7 act as fire barrier. The fire barrier layer has mainly the function of avoiding direct contact of the inner core with the flames which surround the cable in case of fire.

A water barrier (not illustrated), which is dielectric and made of water swellable material (for example, supported by a tape) may surround the core 1a in a radial position internal with respect to the first mica layer 7 or over the glass yarns 8.

In radial external position and in direct contact with the layer of glass yarns 8, an inner sheath 9 is provided. The inner sheath 9 can be extruded directly on the layer of glass yarns 8. In an alternative embodiment, water swellable material in form of one or more water swellable tapes can be interposed between the layer of glass yarns 8 and the inner outer sheath 9.

The inner sheath 9 can have a thickness between 1 and 3 mm. In one embodiment, such thickness is of 2.5 mm.

The inner sheath 9 is made of a flame retardant LSoH polymer material. The material of the inner sheath 9 contains magnesium hydroxide in an amount of about 200 phr. This material can have a LOI of 37%.

In radially outer position with respect to the inner sheath 9, a second mica layer 10 is provided. The second mica layer 10 may comprise two mica tapes similar to those used for the first mica layer 7. In an embodiment, each mica tape of the second mica layer 10 is wound with an overlapping. The overlapping can be higher than 40%, for example of 50%.

In a radially outer position to and in direct contact with the second mica layer 10, an outer sheath 11 is provided. The outer sheath 11 can be extruded directly on the second mica layer 10. In an alternative embodiment, a polyester tape can be interposed between the second mica layer and the outer sheath.

The outer sheath 11 can have a minimum thickness between 1 and 3 mm. In one embodiment, such thickness is of 2.5 mm.

Outer sheath 11 is made of a flame retardant LSoH polymeric material. The material of the outer sheath 11 contains magnesium hydroxide in an amount of about 200 phr. This material can have a LOI of 37%.

Example

The Applicant has conducted fire-resistance tests on different cables.

All of the tested cables have a structure analogous to that of cable 1 of FIG. 1 and contained 144 fibers in 12 buffer tubes, 12 fibers each. The buffer tubes of Cable 1 (comparative) were filled with a severely hydrotreated and hydrocracked base mineral oil having a drop point lower than 200° C. (about 180° C.), while the buffer tubes of Cable 2 (according to the present disclosure) were filled with a polydimethylsiloxane gel having a drop point greater than 250° C.

Cable 1 (comparative) and Cable 2 had a central strength member made of GRP hydroxy-containing flame retardant polymeric material having a LOI of 28%.

The inner and outer sheath of Cable 1 and Cable 2 were made of the same flame retardant LSoH polymer-based material containing magnesium hydroxide and having a LOI of about 37%.

Cable 1 (comparative) failed the fire resistance test performed on these cables according to IEC 60331-25 (1999). After 90 minutes at 750° C., a 2.54 dB signal attenuation was detected. After a cooling, a 5.58 dB signal attenuation was observed and cracks of the optical fibers were detected. Cable 2 according to the present disclosure passed the fire resistance test performed according to IEC 60331-25 (1999). After 90 minutes at 750° C., a 1.34 dB signal attenuation was detected. After a cooling of 15 minutes, a 1.51 dB signal attenuation was detected, and the optical fibers were found to be fully functioning (not breakage, no signal disconnection).

Cable 2 according to the present disclosure also passed the fire resistance test according to IEC 60331-1 (2009). After 90 minutes at 830° C. a signal attenuation was detected, but no optical fibers breakage were detected.

In addition, Cable 2 according to the present disclosure was tested according to IEC 60332-3-24 (2000) and gave a flame propagation in vertical position of 770 mm (the maximum propagation according to the standard is 2,500 mm). Also Cable 2 was tested according to IEC 61034-2 (2005) relating to the density of the smoke generated by the cable while burning and gave a light transmission of 80.52% (the light transmission according to the standard has to be of at least 60%).

The invention claimed is:

1. Fiber optic cable comprising:
   a core comprising:
      a central strength member, and
      a plurality of buffer tubes arranged around the central strength member, each of the plurality of buffer tubes containing a plurality of optical fibers;
   a first mica layer arranged around the core;
   a glass yarn layer surrounding and in direct contact with the first mica layer;
   an inner sheath surrounding the glass yarn layer;
   a second mica layer surrounding the inner sheath; and
   an outer sheath surrounding the second mica layer,
      wherein each of the plurality of buffer tubes comprise a water-blocking filling material comprising a silicone gel, wherein the silicone gel has a drop point of at least 200° C., wherein the fiber optic cable is a fire resistant all dielectric fiber optic cable.

2. The fiber optic cable of claim 1, wherein the plurality of optical fibers comprises at least 24 optical fibers.

3. The fiber optic cable of claim 1, wherein the central strength member comprises a hydroxide-containing flame retardant polymeric material.

4. The fiber optic cable of claim 3, wherein the plurality of optical fibers comprises at least 72 optical fibers.

5. The fiber optic cable of claim 3, wherein the central strength member comprises a body and the hydroxide-containing flame retardant polymeric material is in form of a layer on the outer surface of the body.

6. The fiber optic cable of claim 3, wherein the hydroxide-containing flame retardant polymeric material of the central strength member is a LSoH material.

7. The fiber optic cable of claim 3, wherein the hydroxide-containing flame retardant polymeric material of the central strength member has a limiting oxygen index (LOI)≤35%.

8. The fiber optic cable of claim 1, wherein the silicone gel has a drop point of ≥250° C.

9. The fiber optic cable of claim 1, wherein a water swellable material is interposed between the core and the first mica layer and/or between the glass yarn layer and the inner sheath and/or between the inner sheath and the second mica layer.

10. The fiber optic cable of claim 1, wherein the inner sheath and/or the outer sheath are made of a flame retardant LSoH polymer-based material.

11. The fiber optic cable of claim 10, wherein the flame retardant LSoH polymer-based material has a limiting oxygen index (LOI)≥30%.

12. The fiber optic cable of claim 10, wherein the flame retardant LSoH polymer-based material has a limiting oxygen index (LOI)≤70%.

13. The fiber optic cable of claim 10, wherein the inner sheath and the outer sheath are made of the same LSoH flame-retardant polymer-based material.

14. The fiber optic cable of claim 1, wherein the inner sheath and the outer sheath are made of a flame retardant LSoH polymer-based material, and wherein the flame-retardant LSoH polymer-based material of the inner sheath has a LOI higher than the LOI of the outer sheath material.

15. The fiber optic cable of claim 1, wherein at least one the first mica layer and of the second mica layer comprises two mica tapes wound in the same direction.

16. The fiber optic cable of claim 1, wherein a water swellable material is interposed between the core and the first mica layer, and between the glass yarn layer and the inner sheath, and between the inner sheath and the second mica layer.

17. A fiber optic cable comprising:
   a core comprising:
      a central strength member, and
      a plurality of buffer tubes arranged around the central strength member, each of the plurality of buffer tubes containing a plurality of optical fibers;
   a first mica layer arranged around the core;
   a glass yarn layer surrounding and in direct contact with the first mica layer;
   an inner sheath surrounding the glass yarn layer;
   a second mica layer surrounding the inner sheath;
   an outer sheath surrounding the second mica layer; and
   a water swellable material interposed between the core and the first mica layer, or between the glass yarn layer and the inner sheath, or between the inner sheath and the second mica layer, wherein each of the plurality of buffer tubes comprise a water-blocking filling material comprising a silicone gel, wherein the silicone gel has a drop point of at least 200° C., wherein the fiber optic cable is a first resistant all dielectric fiber optic cable.

18. The fiber optic cable of claim 17, wherein the central strength member comprises a hydroxide-containing flame retardant polymeric material, and wherein the inner sheath and the outer sheath is made of a flame retardant LSoH polymer-based material.

19. A fiber optic cable comprising:
a core comprising:
  a central strength member, and
  a plurality of buffer tubes arranged around the central strength member, each of the plurality of buffer tubes containing a plurality of optical fibers;
a first mica layer arranged around the core;
a glass yarn layer surrounding and in direct contact with the first mica layer;
an inner sheath surrounding the glass yarn layer;
a second mica layer surrounding the inner sheath;
an outer sheath surrounding the second mica layer, wherein the inner sheath or the outer sheath is made of a flame retardant LSoH polymer-based material; and
wherein each of the plurality of buffer tubes comprise a water-blocking filling material comprising a silicone gel, wherein the silicone gel has a drop point of at least 200° C., wherein the fiber optic cable is a first resistant all dielectric fiber optic cable.

20. The fiber optic cable of claim 19, further comprising a water swellable material interposed between the core and the first mica layer, and between the glass yarn layer and the inner sheath, and between the inner sheath and the second mica layer.

* * * * *